United States Patent
Rudling (10) Patent No.: US 8,696,317 B2
(45) Date of Patent: Apr. 15, 2014

(54) WIND TURBINE BLADE

(75) Inventor: Paul Rudling, Calbourne (GB)

(73) Assignee: Blade Dynamics Limited, Isle of Wight (GB)

(*) Notice: Subject to any disclaimer, the term of this patent is extended or adjusted under 35 U.S.C. 154(b) by 801 days.

(21) Appl. No.: 12/677,670

(22) PCT Filed: Jul. 28, 2008

(86) PCT No.: PCT/GB2008/002569
§ 371 (c)(1),
(2), (4) Date: Jun. 21, 2010

(87) PCT Pub. No.: WO2009/034291
PCT Pub. Date: Mar. 19, 2009

(65) Prior Publication Data
US 2010/0260611 A1    Oct. 14, 2010

(30) Foreign Application Priority Data
Sep. 11, 2007 (GB) .................................. 0717690.2

(51) Int. Cl.
*F03D 11/02* (2006.01)
(52) U.S. Cl.
USPC ........................................ 416/226; 416/241 A
(58) Field of Classification Search
USPC .......... 416/226, 241 A; 244/35 R, 7 A, 8, 39, 244/17.11, 123.7, 17.25
See application file for complete search history.

(56) References Cited

U.S. PATENT DOCUMENTS

| | | | |
|---|---|---|---|
| 1,611,717 A * | 12/1926 | Bushyager ....................... 416/89 |
| 1,685,881 A | 10/1928 | Nixon | |
| 2,493,139 A | 1/1950 | Heath | |
| 2,574,980 A | 11/1951 | Meyers | |
| 3,528,753 A * | 9/1970 | Dutton et al. ................. 416/226 |
| 4,339,230 A | 7/1982 | Hill | |
| 4,389,162 A | 6/1983 | Doellinger et al. | |
| 4,474,536 A | 10/1984 | Gougeon et al. | |
| 4,498,649 A * | 2/1985 | Toll ............................ 244/118.6 |
| 4,877,374 A | 10/1989 | Burkett | |
| 4,976,587 A * | 12/1990 | Johnston et al. .............. 416/230 |
| 5,401,138 A * | 3/1995 | Mosiewicz .................... 416/226 |
| 5,476,704 A * | 12/1995 | Kohler .......................... 428/119 |
| 5,632,602 A | 5/1997 | Herrmann et al. | |
| 5,660,527 A | 8/1997 | Deering et al. | |
| 6,513,757 B1 * | 2/2003 | Amaoka et al. ............. 244/123.7 |
| 8,348,622 B2 * | 1/2013 | Bech .......................... 416/229 R |
| 2004/0108732 A1 * | 6/2004 | Weitkamp ....................... 290/55 |
| 2006/0104812 A1 * | 5/2006 | Kovalsky et al. ............... 416/87 |

FOREIGN PATENT DOCUMENTS

| | | |
|---|---|---|
| EP | 0258926 A1 | 3/1988 |
| EP | 1184566 A1 | 3/2002 |
| EP | 1584817 A1 | 10/2005 |
| GB | 2416195 A | 1/2006 |
| SU | 571628 A1 | 9/1977 |
| WO | 9520104 A1 | 7/1995 |
| WO | WO-9520104 A1 * | 7/1995 |
| WO | 2006002621 A1 | 1/2006 |

OTHER PUBLICATIONS

Haj-Ali et al (Nonlinear behavior of pultruded FRP composites; Composites: Part B 33 (2002) 173-191).*
PCT International Search Report for International Application No. PCT/GB2008/002569 dated Sep. 23, 2009.

* cited by examiner

*Primary Examiner* — Edward Look
*Assistant Examiner* — Juan G Flores
(74) *Attorney, Agent, or Firm* — Patterson & Sheridan, LLP (57) ABSTRACT

A spar (30) for a wind turbine blade. The spar comprises a plurality (typically three or more) beams (33) arranged side-by-side. Each beam has a longitudinal web (32), a flange (31) at either longitudinal edge. The spar may be made up of a number of modules connected to one another primarily via overlapping shear webs.

17 Claims, 13 Drawing Sheets

WIND TURBINE BLADE

The present invention relates to wind turbine blades and methods of manufacture for wind turbine blades.

The current approach to manufacturing wind turbine blades is to produce each blade either as two half shells and a spar, or as two half shells with an integral spar cap and shear webs. In both cases, the two half shells are bonded together along their leading and trailing edges to form the complete blade.

The blades are typically made from fibre reinforced plastic using either resin infusion or prepreg techniques. In both cases, the blades are produced in large labour and capital intensive facilities and then transported to the location of the wind turbine or wind farm.

The shortcomings of the current approach are primarily related to scale, wind turbine blades typically being 40 m in length or more. As the size of the blades increase, so does the associated cost and probability of manufacturing defects, as large, high quality, components are notoriously difficult to manufacture. Furthermore, in order to compensate for the defect probability the blades are over-engineered leading to higher relative blade mass. This in turn leads to higher turbine loads, installation and material costs.

In use, larger blades are more desirable than smaller blades since they trace a larger envelope and therefore capture a greater proportion of the available wind energy. This means that fewer wind turbines are needed for the same power generation capability.

Notwithstanding the above, the larger the blades are, the more difficult and expensive they become to transport. This is aggravated by the fact that many wind turbines are located in hilly areas which may be inaccessible by road. Occasionally, blades are cut in half to reduce the overall length of the structure to be transported, a field join being made later at the site of the wind turbine. However, this is not a satisfactory solution, involving as it does, the cutting in half of an otherwise structurally sound and expensive component.

A number of approaches have been proposed to address this problem.

EP 1 584 817 and WO 2006/002621 disclose a wind turbine blade sub-divided into two or more modules. Each module has a reinforcement structure in the form of a box section. A number of protrusions protrude from the end of the beam and are designed to mate with corresponding protrusions on an adjacent module.

Also of some relevance to the present invention is WO 03/087572 which discloses a wind turbine blade which does not have a modular construction. It discloses a spar having two halves one on top of the other. When the spar is made up, spacers are inserted between the two spar sections to ensure that the two parts of the blade are correctly aligned.

The present invention is directed to an improvement of the modular design of blade typified by EP 1 584 817 and WO 2006/002621.

In a first aspect, the present invention provides a spar for a wind turbine blade, the spar comprising three or more beams arranged side by side, each beam having a longitudinal web with a flange at either longitudinal edge.

A spar made up of beams is beneficial as the beams can be standardised, quality assured, cheap to produce, elements which are simple to transport and can be connected together to form a more complex shape as typically required for a wind turbine blade spar.

One or more of the beams may be a closed box section as this provides additional structural rigidity. Alternatively, one or more of the beams is an open section beam. This is advantageous as it reduces the number of webs, and thereby the amount of material used, in the spar. A mixture of different beam types may also be used to tailor the properties of the spar to particular requirements.

Preferably, at least one of the one or more open-section beams is an I-beam or a channel section beam which have readily calculable structural properties. Again, a mixture of beam types may be used.

In a preferred example, the plurality of beams are adhered together for ease of assembly. Alternatively, or additionally, the plurality of open-section beams are connected together by mechanical fixings, again, for ease of assembly.

The flanges preferably comprise pre-formed fibre reinforced plastic. They may be prepreg or infused parts, but are preferably pulltruded. This is beneficial as the pulltrusion of composite components is an almost 100% material efficient process. The cost of material wastage associated with wind turbine blade manufacture may therefore be significantly reduced. The parts may be cured or semi-cured.

Preferably, the webs comprise multi-axial fibre reinforced plastic which is suitable for bearing torsional loads. Alternatively, the webs may comprise a pulltruded multi-axial fibre reinforced plastic.

The flanges and webs are preferably adhered together. Alternatively or additionally, the flanges and webs are connected together by mechanical fixings.

In a preferred example, the spar comprises a plurality of spar units arranged end to end along the length of the spar. This alleviates the problems and expense of transporting a full length spar. Preferably the spar units are of a length that they can easily fit in with standard global logistics solutions.

Preferably adjacent spar units are primarily connected together at their webs for ease of assembly. Although the flanges of adjacent spar units may also be connected together, this is not necessary for the structural integrity of the spar. Indeed, not connecting the flanges may be beneficial in certain circumstances. If the flanges are not connected, different materials may be used for the flanges of adjacent sections without any problems of thermal mismatch caused by connecting the flanges. This is particularly useful to allow expensive carbon fibre reinforced plastic to be limited only to critical parts of the blade such as the mid-section and allow the use of cheaper material to be used at the ends of the spar.

Preferably, the webs of adjacent units overlap and are joined together.

For joints such as that of EP 1 584 817 and WO 2006/002621, connections between adjacent elements are made in an axial manner, predominantly in the main load carrying spar or spar cap part of the structure. In the case of EP1584817, this requires a significant amount of extra structural material to reinforce the axial connection and prevent flexural mismatch between the metallic connectors and the underlying composite material. In the case of WO2006/002621 additional material, complex terminations and multiple accurate dimensions are needed to make the joint in the main load carrying reinforcement material. This causes the blade to become locally stiff in the region of the joint leading to poor aerodynamic behaviour and also increasing the weight and cost of the blade.

By making the connection through multiple overlapping webs, the connection has the advantage that all of the load from section to section is transmitted in shear (as opposed to predominantly axially as in the prior art above) through the webs allowing the connection to be made without noticeably affecting the bend characteristics of the blade in the joint area.

The spar designed with a plurality of beams side by side allows the presence of multiple shear webs. This prevents the issue of buckling of the webs from becoming a problem.

Preferably, each web is provided with at least one bearing block to transmit the load from the shear web into an adjacent bearing block and then into the shear web associated with the adjacent bearing block.

The adjacent spar units are preferably connected together by mechanical fixings. Alternatively or additionally, adjacent spar units are adhered together. The load is transmitted between adjacent bearing blocks via the mechanical connection or adhered connection.

In a preferred example at least one pair of adjacent spar units comprise dissimilar materials. This is beneficial as more expensive, stiffer, material, such as carbon fibre reinforced plastic, can be used in the main load bearing regions of the spar, for example in the central section, and less expensive material, for example glass fibre reinforced plastic, can be used in the remaining sections of the spar.

In one preferred example the height of the webs decrease along the length of the spar such that the flanges of each beam approach one another along the length of the spar in order to produce a taper from one end of the spar to the other.

Similarly, in another preferred example, the width of the spar decreases along the length of the spar. This may be achieved by narrowing the flanges along the length of the spar. Alternatively or additionally, beams of differing lengths may be used to decrease the width of the spar by terminating the outermost beams before the end of the adjacent, inner, beams.

The beams may preferably be of differing heights in order to allow the assembled spar to better conform to the outer curved profile of the blade.

In one example at least one of the beams is offset from an adjacent beam such that the flanges of the at least one offset beam are not coplanar with the flanges of the adjacent beam. This allows a spar having a twist to be formed.

In a second aspect, the present invention provides a wind turbine blade having a spar according to the first aspect of the invention.

In a third aspect, the present invention provides a method of assembling a spar for a wind turbine blade, the method comprising providing a plurality of beams each extending for the full depth of the spar, each beam having at least one longitudinal web with a flange a either longitudinal edge, and joining the plurality of beams side by side.

Preferably the method further comprises joining a plurality of spar units end to end along the length of the spar. The spar units are preferably connected primarily at their webs.

In a fourth aspect, the present invention provides a modular wind turbine blade, the blade comprising a root at one end for connection to a hub, a spar extending from the root towards a tip at the opposite end, and at least two skin panels which are supported by the spar and which form a closed blade section, wherein the spar comprises a plurality of spar units arranged end to end along the length of the spar, and wherein the spar comprises a plurality of beams arranged side by side, each beam having a longitudinal web with a flange at either longitudinal edge.

The wind turbine blade of the fourth aspect of the present invention is advantageous as the problems and expense associated with transporting a full length spar are avoided.

Preferably adjacent spar units are primarily connected together at their webs.

It is often desirable to use curved wind turbine blades which are arranged so that the tip is closer to windward when the blade is mounted on a hub in an unloaded configuration. Such a configuration is beneficial since less stiffening material needs to be used in the blade in order to prevent tower strike.

In one preferred example, at least one of the spar units is curved. Preferably the curvature is such that the tip of the blade is closer to windward when the blade is mounted on the hub in an unloaded configuration. Alternatively or additionally the curvature is such that the tip of the blade is behind the rest of the blade in the direction of rotation. This arrangement is advantageous since it allows for a curved spar, and thus a curved wind turbine blade, to be formed without the need for complex and expensive curved jigs or moulds. Furthermore, the modular design of the spar allows for either a substantially straight or a substantially curved spar to be produced from a standard set of spar units which may be selected to best fit the conditions in which the wind turbine will be operating. Such an arrangement can, for example, be designed to provide a load shedding capability when the blade is in use.

The at least one curved spar unit is preferably located proximate the tip of the blade. Alternatively, the at least one curved spar unit is located between two substantially straight spar units so that the curve is located away from the tip of the blade. Thus it can be seen that the modular design of the spar allows for considerable flexibility in the wind turbine design without the associated tooling costs.

In a preferred example, the at least one curved spar unit, and/or one or more of the root, spar units or skin panels are made from fibre reinforced plastic. Alternatively the at least one curved spar unit, and/or one or more of the root, spar units or skin panels are made from other suitable materials such as wood or metal.

Adjacent sections of the spar are preferably connected together by mechanical fixings for ease of assembly. Alternatively or additionally, adjacent sections of the spar are bonded together, again, for ease of assembly.

The manner in which adjacent spar sections are joined as described above has broader applications beyond the spar made up of a plurality of beams arranged side by side. In particular, it could also be applied to a known spar having a single box beam section such as those known in WO2006/002621 and EP1584817.

According to this aspect of the invention there is provided a modular spar for a wind turbine blade, the spar comprising a plurality of spar units arranged end to end, wherein each spar unit comprises, at least in the region adjacent to an adjacent unit, a plurality of shear webs overlapping with the adjacent spar unit, the units being primarily connected together via the overlapping shear webs.

Preferably the modular spar further comprises bearing blocks to support the join between adjacent shear webs. Adjacent webs may then be pinned together via the bearing block.

If the bearing block is applied to a single box beam section, each spar unit comprises a single box beam section having a pair of shear webs, and at least one auxiliary shear web extends between the shear webs of the box beam section in a direction generally parallel to the shear webs of the box beam section, and at least in the portion of the spar unit adjacent to an adjacent unit.

This aspect of the invention may also extend to a blade comprising the modular spar, the spar may be integral with the blade skin for example as shown in EP1584817.

An example of the present invention will now be described with reference to the following drawings in which.

Figure 1:
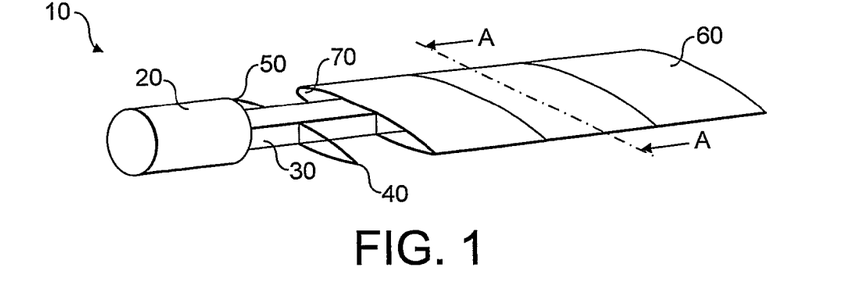
FIG. 1 is a schematic isometric view of a partially completed wind turbine blade.

FIG. 1 shows a partially complete wind turbine blade 10 comprising a load bearing spar 30 which is connected to a root subassembly 20 as will be described in greater detail below. The spar 30 supports frame members 40, 50 onto which skin panels 60, 70 are mounted to form the outer surface of the blade 10.

Figure 2:
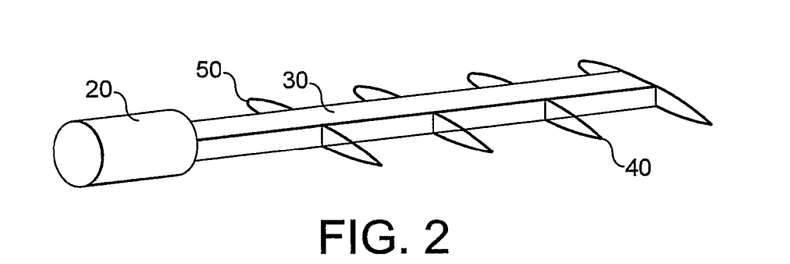
FIG. 2 is a schematic isometric view of the spar, frame and root subassembly of the blade of FIG. 1.
Figure 3:
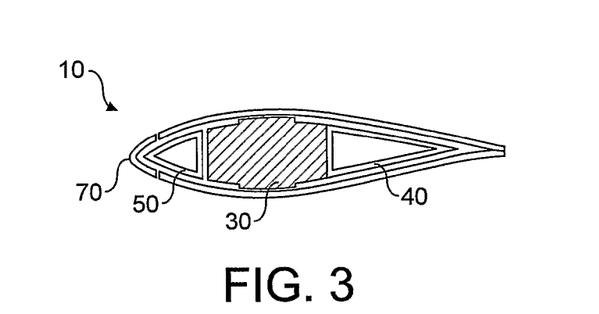
FIG. 3, is a schematic cross-sectional view along the line A-A of FIG. 1.

In the example shown in FIGS. 1 to 3, the frame members 40, 50 are made of carbon fibre reinforced plastic and consist of leading side frame members 50 and trailing side frame members 40. As shown, the frame members 40, 50 are shaped to largely correspond to the cross-sectional profile of the blade 10. In an alternative construction, the frame members may be integral with the skin panels rather than the spar as set out in our earlier application GB 0807515.2

The skin panels 60, 70 are attached to the frame members 40, 50 and spar 30 to form a continuous outer skin. The leading edge skin panels 70 are attached to the leading side frame members 50 and the remaining skin panels 60 are attached to the leading side frame members 50, the spar 30 and trailing side frame members 40.

The skin panels 60 are made of glass fibre reinforced plastic and have a gel coat or paint which is applied either before or after the skin panels 60 are assembled on the frame. Alternatively, the panels are covered with a coating such as that disclosed in GB0805713.5. The leading edge skin panels 70 are made of a composite material and have a wear resistant coating which is applied either before or after the leading edge skin panels 70 are assembled.

The root assembly 20, spar 30, frame members 40, 50 and skin panels 60, 70 are glued together in a jig to ensure dimensional accuracy. The jig itself (not shown) is a modular jig comprising a plurality of jig modules none of which exceeds 20 m in length to facilitate transport of the jig modules to the wind turbine assembly site. In this example mechanical fixings such as bolts and clips are also used to connect the various components of the blade 10 together. In an alternative example, only glue or only mechanical fixings may be used.

Figure 4:
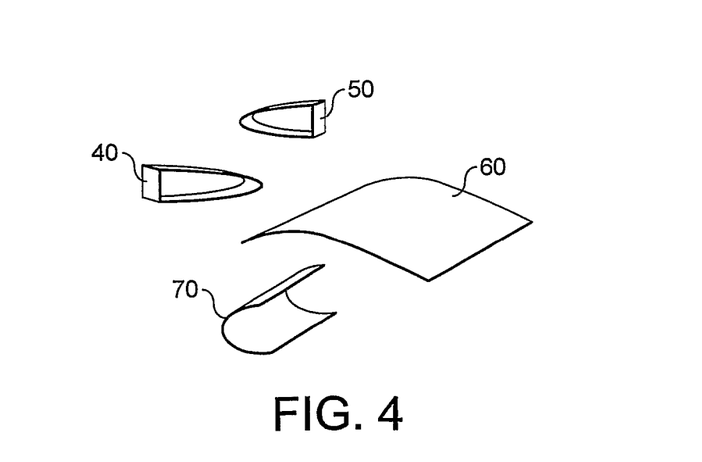
FIG. 4 is a schematic isometric view of the skin panels and frame members of FIG. 1 prior to assembly.

FIG. 4 shows examples of the individual skin panels 60, 70 and frame members 40, 50 which form part of the kit for making the finished blade 10. The skin panels 70, 60 are shaped so that they may be stacked one within another during storage and transport.

Figure 5:
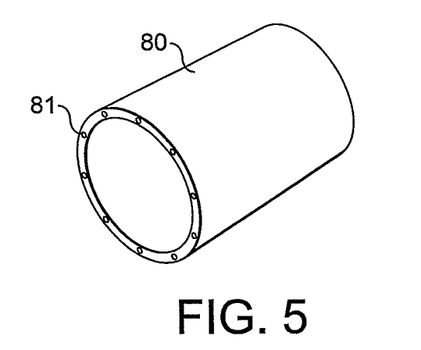
FIG. 5 is a schematic isometric view of a tubular support member which forms part of the root subassembly of FIG. 1.

FIG. 5 shows a tubular support member 80 which forms part of the root subassembly 20 of FIG. 1. The tube 80 is a filament wound glass fibre reinforced plastic tube of approximately 5 m in length. The tube 80 is manufactured on a male mandrel so that it has a precise internal dimension. Threaded holes 81 are located in one end of the tube 80 for connection to the hub of a wind turbine.

Figure 6:
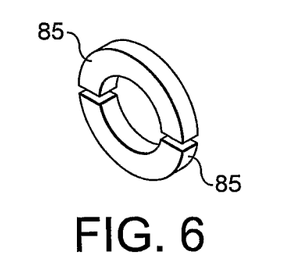
FIG. 6 is a schematic isometric view of a pair of support mouldings which form part of the root subassembly.

A pair of glass fibre reinforced plastic support mouldings 85 are shown in FIG. 6. These support mouldings 85 have an accurate outer curved surface which is achieved either by using a female mould or by machining. The support mouldings 85 are C-shaped with an outer radius of curvature which matches that of the internal radius of curvature of the tube 80.

Figure 8:
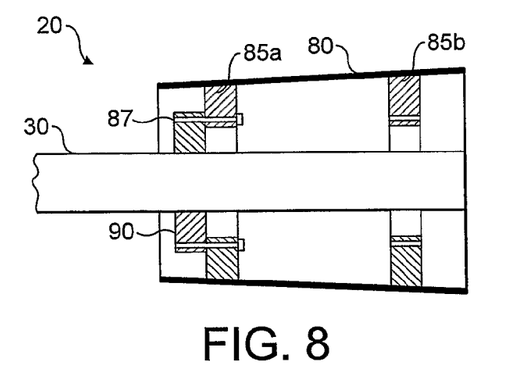
FIG. 8 is a schematic cross-sectional side view of the root subassembly during assembly.
Figure 9:
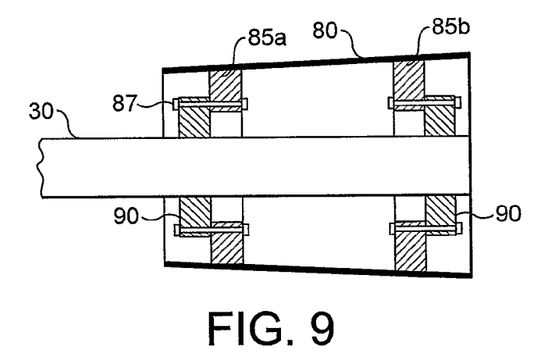
FIG. 9 is a schematic cross-sectional side view of the complete root subassembly.

As shown in FIGS. 8 and 9, two pairs of support mouldings 85 are bonded to the inner surface of the tube 80. The support mouldings, which are approximately 100 mm to 150 mm deep, are bonded approximately 200 mm from either end of the tube 30.

Figure 7:
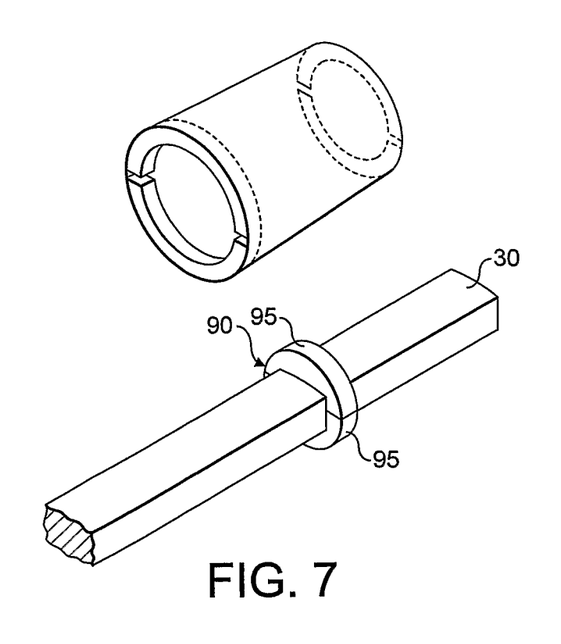
FIG. 7 is a schematic isometric view of a bulkhead attached to the spar of FIG. 1.

FIG. 7 shows a glass fibre reinforced plastic bulkhead 90 bonded to a portion of the spar 30. In this example the bulkhead 90 comprises two halves 95 which are bonded to each other and to the spar 30. In an alternative example, the bulkhead 90 is a single piece with a hole through it to receive the spar 30.

During assembly, a first bulkhead 90 is bonded to the spar 30. The spar 30 is then inserted into the tube 80 from the end opposite to the hub connection end until the bulkhead 90 abuts a first pair support mouldings 85a. The bulkhead 90 is then attached to the support mouldings 85a by adhesive and bolts 87 which extend through the bulkhead 90 and support moulding 85a. A second bulkhead 90 is then bonded to the portion of the spar within the tube 80 and attached to the second pair of support mouldings 85b by adhesive and bolts 87.

Figure 10:
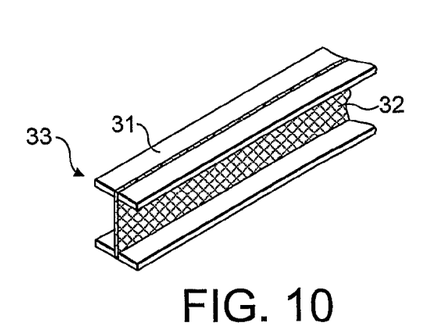
FIG. 10 is a schematic isometric view of an open-section beam which forms a part of the spar of FIG. 1.
Figure 11:
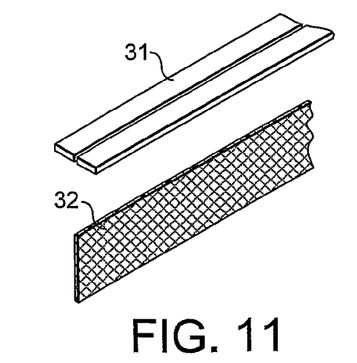
FIG. 11 is a schematic isometric view of the component parts of the open-section beam of FIG. 10.

FIG. 10 shows an open-section I-beam 33 which forms part of the spar 30. The I-beam 33 is itself made up of component flanges 31 positioned either side of a longitudinal web 32 at either longitudinal edge of the web 32. The flanges 31 are made of unidirectional carbon or glass fibre reinforced plastic and the web 32 is made of ±45° multi-axial carbon or glass fibre reinforced plastic. The flanges 31 are formed as pre-forms, for example, in a pulltrusion process and have a rectangular cross-section. The flanges 31 may, in an alternative example, have a curved cross-section to fit the outer profile of the blade more closely. The flanges may be stackable such that extra thickness can be provided for a particular blade part. However, in order to keep the component parts of the spar as simple as possible it is preferred that the flanges have a rectangular or other stackable cross-section. Also, at certain parts of the blade, such as the root end, which bear higher loads parallel to the flange surface, additional pre-forms, for example, in the shape of angle sections may be provided at the interface of the web 32 and each flange 31.

The flanges 31 are adhered to either side of the web 31 proximate the longitudinal edges of the web to form the I-beam 33. Alternatively, the I-beam 33 could comprise two flanges, each having a longitudinal slot for receiving the respective edges of the web. The I-beam 33 is assembled in a jig to ensure dimensional accuracy. In an alternative example, the flanges 31 are connected to the web 32 by mechanical fixings in addition to, or as an alternative to adhesive.

Figures 12, 13, 14:
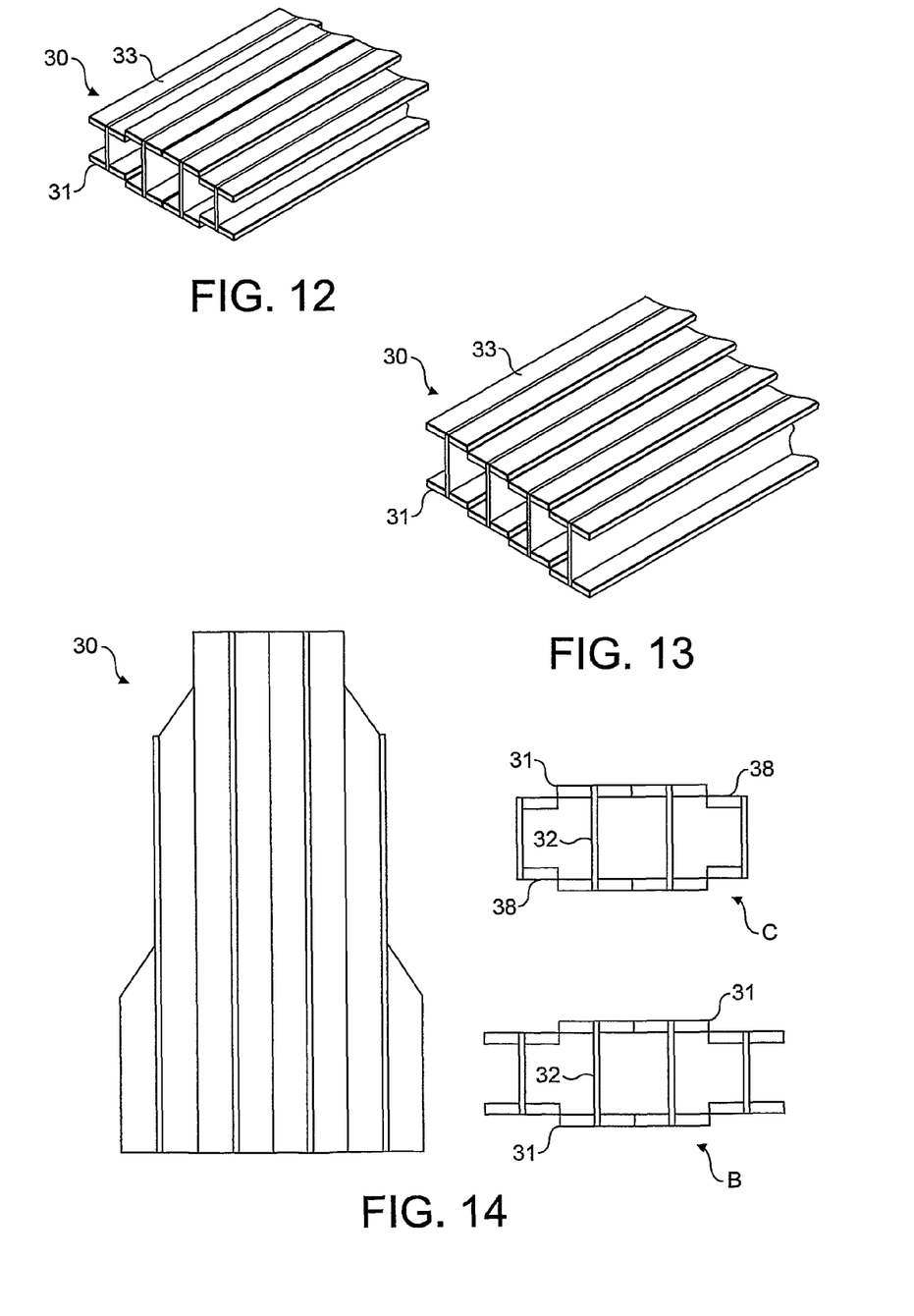
FIG. 12 is a schematic isometric view of a first portion of the spar of FIG. 1.
FIG. 13 is a schematic isometric view of a second portion of the spar of FIG. 1.
FIG. 14 is a schematic view in plan and cross-section of the spar of FIG. 1.

As shown in FIG. 12, the spar 30 is made up of a plurality of I-beams 33 arranged side by side. As shown in cross-sections B and C of FIG. 14, the flanges 31 are located at either side of the spar 30 in a section taken through the spar. The I-beams 33 are held in a jig to ensure dimensional accuracy and are adhered to one another along the flanges 31. Alternatively, or additionally, the flanges may be connected together by mechanical fixings.

In the example shown in FIGS. 12 and 14, the depth of the spar 30 is greatest in the middle. This configuration is used to account for the curvature of the skin panels 60 which attach to the spar 30 and which define the outer surface of the wind turbine blade as shown in FIG. 3. The depth change between the outermost I-beams 33 and the innermost I-beams 33 is achieved by altering the depth of the web 32. Furthermore, the depth of the spar 30 decreases from the root end to the tip end. This decrease in depth is achieved, in part, by decreasing the depth of the webs 32 from one end of the component I-beams 33 to the other, such that they have a substantially trapezoidal configuration. As described further below, the depth of the spar 30 is also decreased along the length of the spar by reducing the overall depth of the webs 32 in successive spar units 35.

FIG. 13 shows another arrangement of the I-beams 33 in a second section of the spar 30 which section includes a twist. In this section the I-beams 33 are arranged side by side with their flanges 31 offset from one another so that the flanges 31 of one I-beam are not coplanar with the flanges 31 of an adjacent I-beam 33. The extent of the offset increases along the length of the spar 30. The twist allows the spar to conform to the outer profile of the blade 10 which twists about the longitudinal axis of the blade.

FIG. 14 shows a view in plan and in cross-section of the spar 30 and illustrates how the width of the spar 30 tapers from the root end to the tip end. This taper is achieved, in part, by dropping off flange sections 31 of the I-beams 33 so that the outermost beams have a channel cross-section (in the shape of a C), rather that an I-beam cross-section. Cross-section B illustrates the widest portion of the spar 30 formed of four I-beams 33, and cross-section C shows a reduced width section of the spar 30 which is formed of two I-beams 33 and two channel beams 38. As will be described further below, the width of the spar 30 is also reduced along the length of the spar by connecting successive spar units 35 having progressively fewer component beams 33, together end to end.

The spar 30 may be formed from a plurality of full length I-beams 33 and/or channel beams 38. However, in the present example, the spar 30 comprises a plurality of spar units 35, each of no more that 12 m in length, joined end to end.

Figure 15:
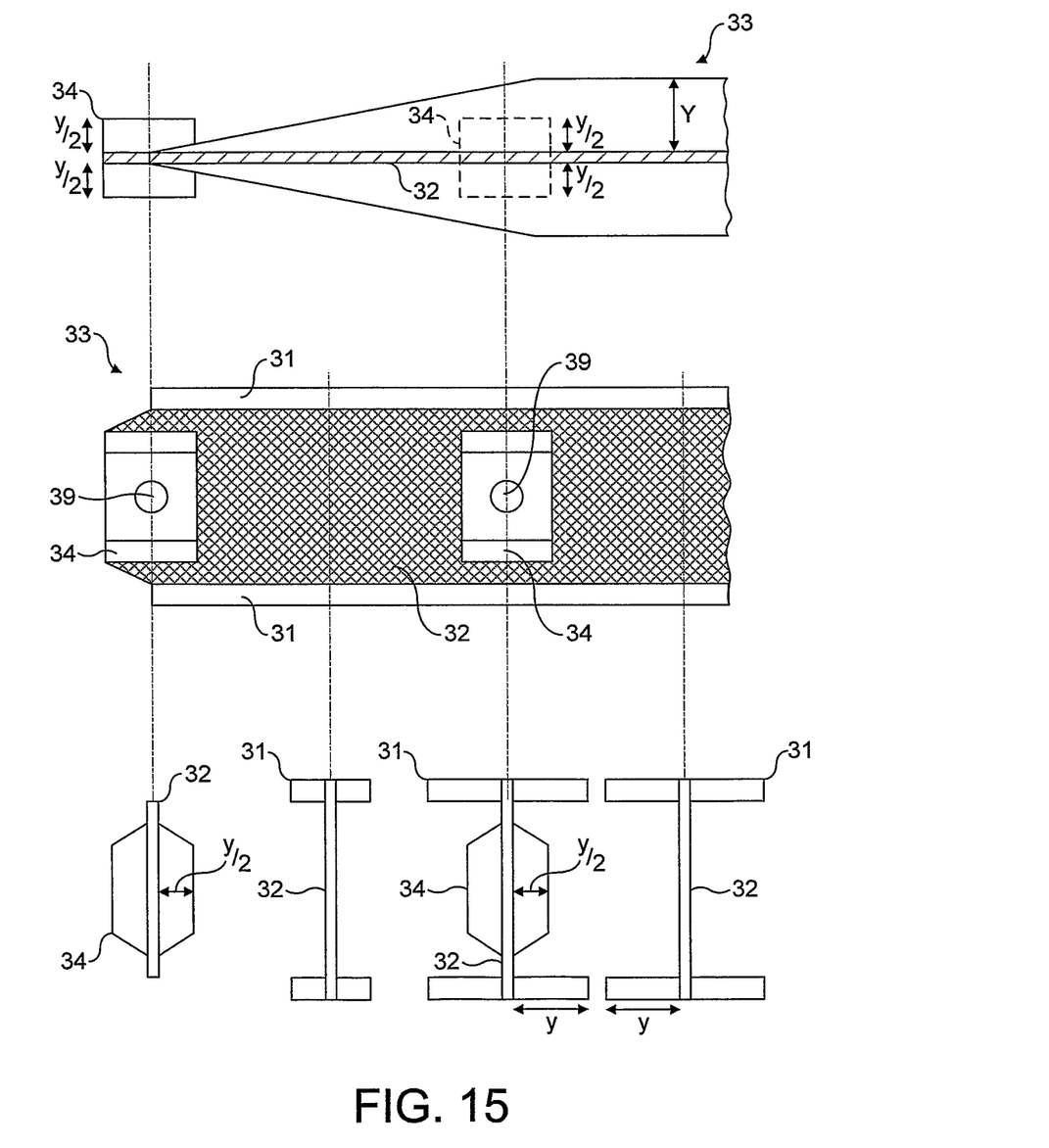
FIG. 15 is a schematic view in plan, side and cross-section of the end of the open-section beam of FIG. 10.

In order to create the join between the spar units 35, each I-beam 33 (or channel beam 38) is terminated in a point as illustrated in FIG. 15. The flanges 31 are tapered down from their maximum width Y to zero at the end of the I-beam 33 over a predetermined length. Bearing blocks 34 made of glass fibre reinforced plastic are bonded and/or mechanically fastened to either side of the web 32 at two positions, one where the flanges 31 begin to taper, and the other centred at the point where the flanges 31 taper to zero. The bearing blocks 34 have a width of Y/2. Each bearing block 34 has a hole 39 to accept a shear pin 36.

The hole may be formed by a metallic tube which has fibre reinforced plastic wound around the outside of it on the surface which is bonded to the block. The shear pin may also be metal. This may be subjected to a very low temperature (for example by being immersed in liquid nitrogen immediately prior to being fitted in the holes 39). It then expands in situ to create a tight fit with the tube.

Figure 16:
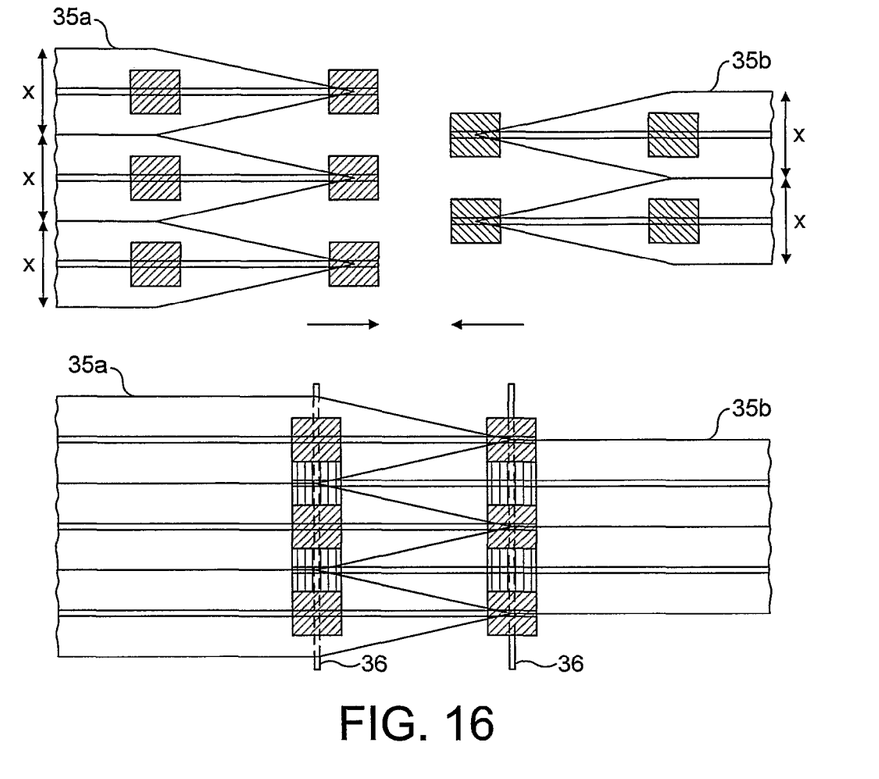
FIG. 16 is an schematic exploded plan view of a join between two spar units forming the spar of FIG. 1.

As an alternative to the pins 36 shown in FIG. 16 shown running transverse to the spar, blocks 34 on adjacent sections may have complementary tapered faces and each facing pair may be joined by a pin running in the longitudinal direction of the spar.

Figure 17:
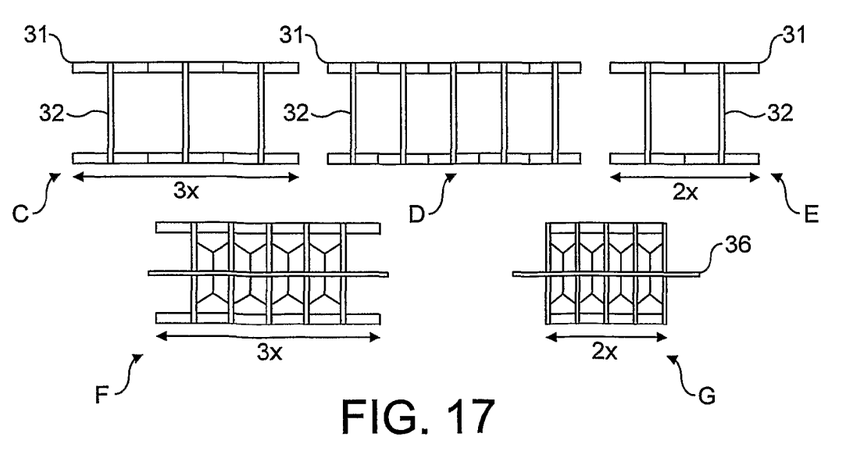
FIG. 17 is a schematic view in plan and cross-section of a completed join between two spar units forming the spar of FIG. 1.

FIG. 16 shows two spar units 35a, 35b prior to connection and FIG. 17 shows the two spar units 35a, 35b connected together by shear pins 36. As shown, the webs 32 of the adjacent spar units 35a, 35b overlap at the join. The mechanical connection between the adjacent spar units 35a, 35b is made via the webs 32 only. The tapered edges of the flanges 31 abut one another but are not physically connected in this example. In an alternative example, the webs 32 of the adjacent spar units 35a, 35b may be alternatively or additionally adhered together via blocks 34. In a further alternative example, the flanges 31 of the adjacent spar units 35a, 35b may be connected by mechanical fixings and/or by adhesive.

Figure 18A:
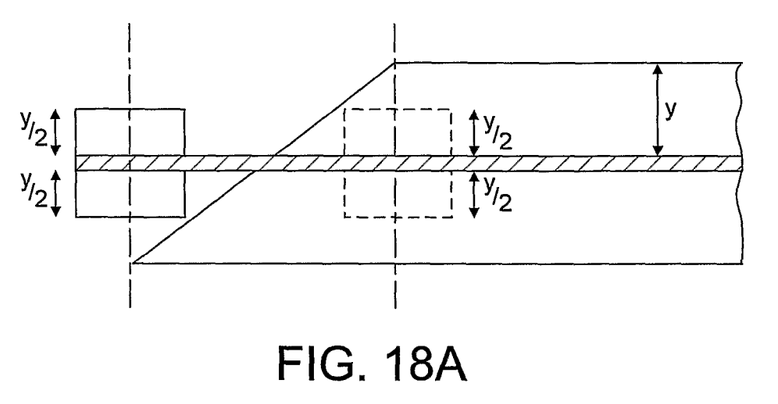
FIGS. 18A and 18B are schematic plan views of alternative end configurations for the open-section beam shown in FIG. 15.
Figure 18B:
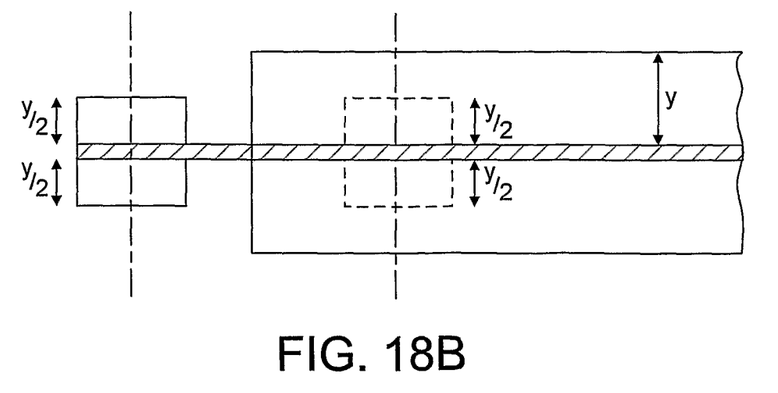

Spar unit 35a comprises three I-beams 33 and spar unit 35b comprises two I-beams 33. However, this is for the purposes of illustration only, the spar units 35 being formable of any number of I-beams 33 and/or channel beams 38 as desired. Similarly, the ends of the flanges 31 need not necessarily be tapered as shown in FIGS. 15, 16 and 17. Alternative end configurations for the flanges 31 are shown in FIGS. 18A and 18B.

Figure 19:
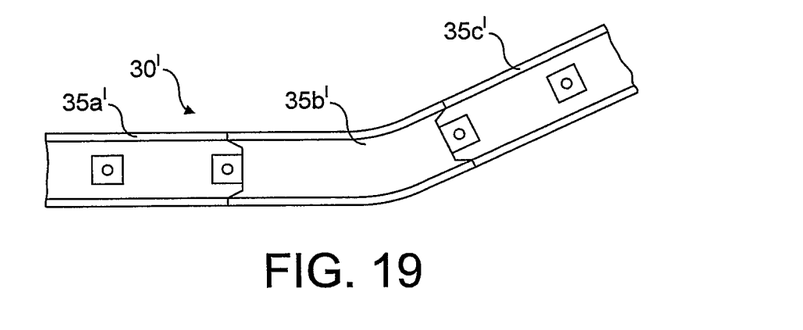
FIG. 19 is a schematic side view of an alternative spar arrangement.
Figure 20:
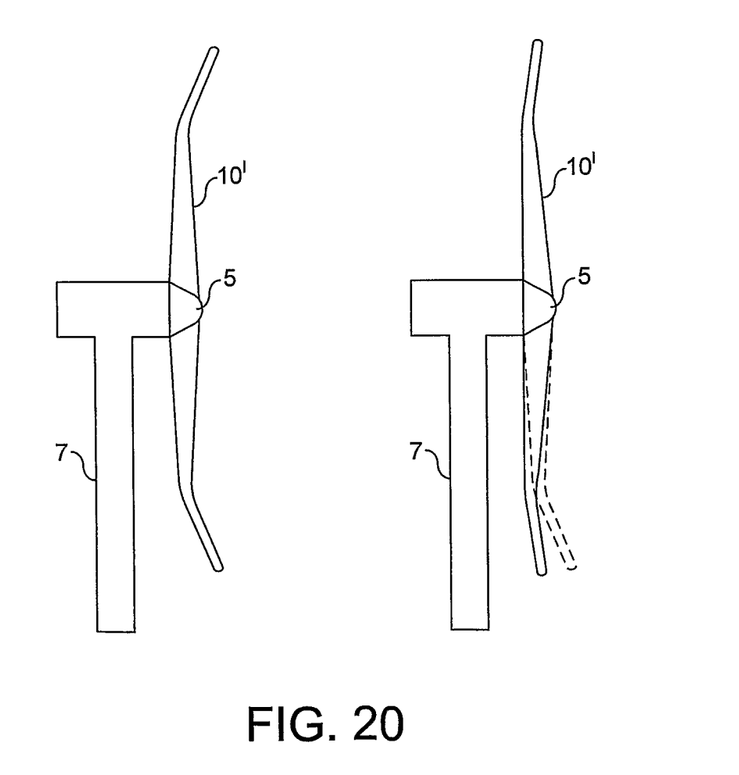
FIG. 20 is a schematic side view of a wind turbine with blades having the spar of FIG. 18.

FIG. 20 shows a blade 10' having a curved configuration which deflects back to a straighter shape under load and FIG. 19 shows a spar 30' for use within the blade 10'.

The spar 30' consists of a plurality of spar units 35a', 35b', 35c' connected together end to end. Spar units 35a', 35c' are substantially straight and are made of composite open-section beams 33 as described above. However, spar unit 35b' has a curved configuration. The spar unit 35b' is connected at either end to the substantially straight spar units 35a', 35c' so that the tip of the spar 30', and thus the tip of the blade 10', is closer to windward when the blade 10' is mounted on a hub 5 in an unloaded configuration.

The spar unit 35b' has a modular open-section beam construction as described above in respect of the substantially straight spar units 35a', 35c'. In an alternative example, the curved spar unit 35b' and/or the substantially straight spar units 35a', 35b' may consist of monolithic cast or machined components. In a further alternative, the curved spar unit 35b' and/or the substantially straight spar units 35a', 35b' may be a combination of metallic and non metallic component parts.

A more detailed arrangement of spar unit 35b' is shown in FIGS. 21A to 21E.

Figure 21A:
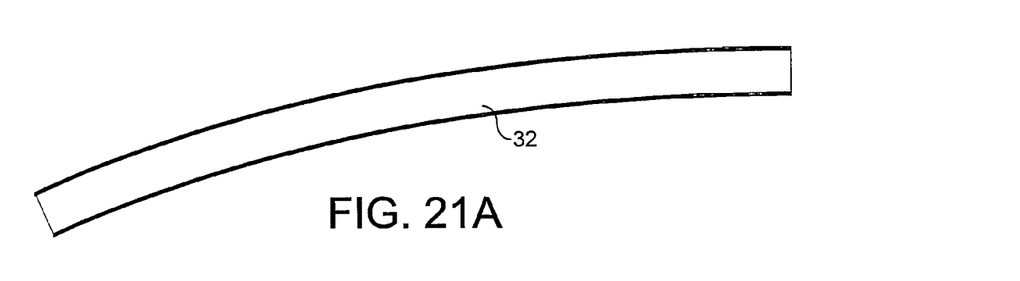
FIGS. 21A-21D are a side view, an end view, a plan view and a perspective view respectively of a spar arrangement suitable for a curved blade such as that shown in FIG. 20.
Figure 21B:
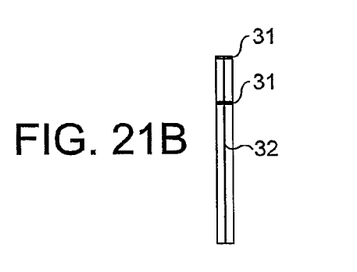
Figure 21C:
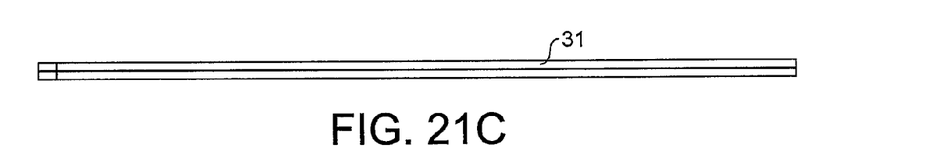
Figures 21D, 21E:
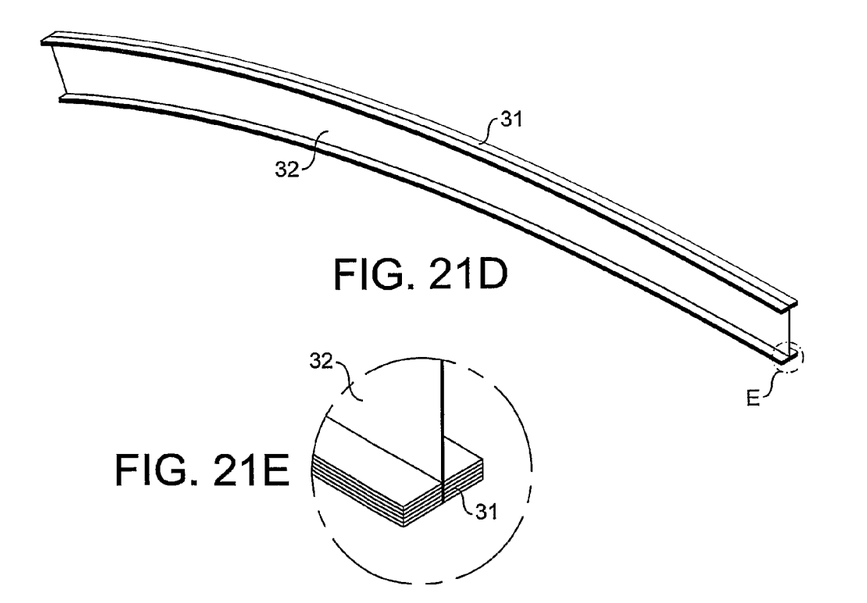
FIG. 21E is a detailed view of the part labelled E in FIG. 21D.

As can be seen, the web 32 is bent down into a curved configuration. The flanges 31 have a laminated configuration as shown in FIG. 21E which allow the curvature of the web 32 to be accommodated. Each lamination is bent to the required extent. It will be appreciated that this design allows different curvatures to be produced with a limited number of parts as it does not require separate components to be designed or produced for each radius of curvature that is required.

Figure 22A:
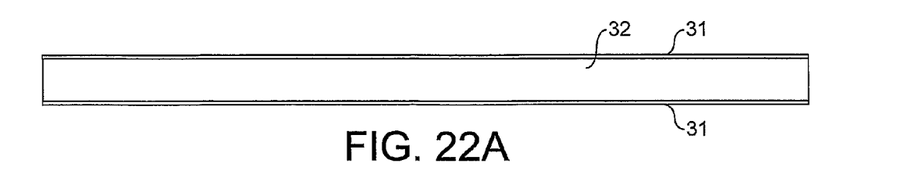
FIGS. 22A-22E are similar views to those of FIGS. 21A-21E of a spar section suitable for creating a blade which is curved within the plane of the rotor disc.
Figure 22B:
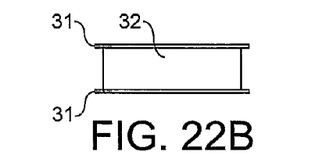
Figure 22C:
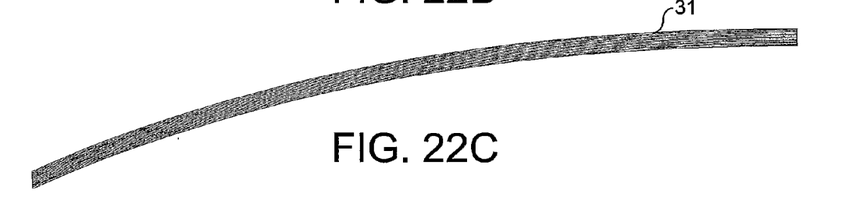
Figures 22D, 22E:
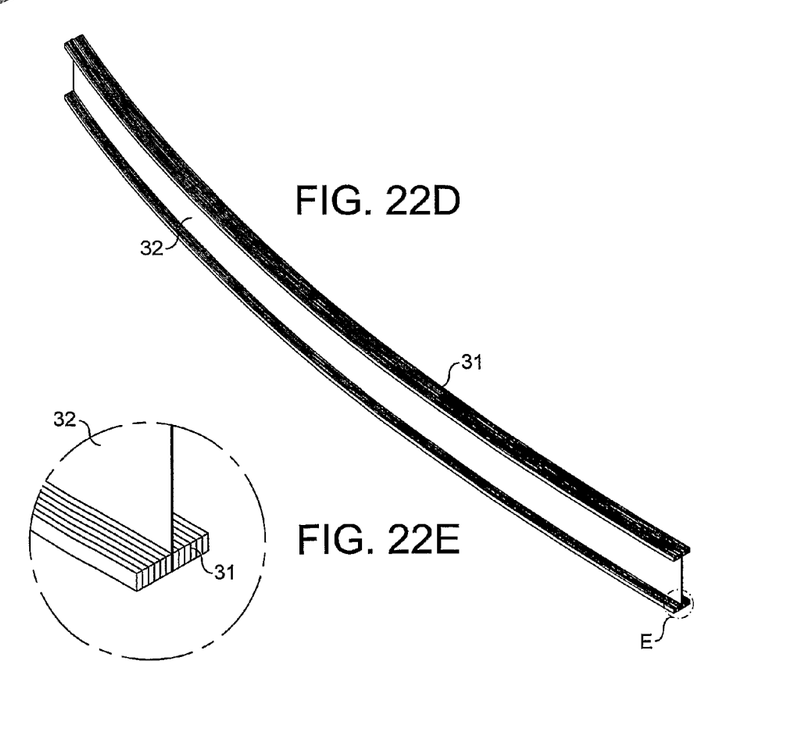

While FIG. 21 illustrates a design suitable for a blade curved out of the plane of the rotor disc as shown in FIG. 20, FIGS. 22A to 22E show a design suitable for use in a blade which is curved in an orthogonal direction, namely within the plane of the rotar disc. In this case, as shown in FIG. 22E, the laminations forming the flanges 31 lie in the plane parallel to the web 32 thereby accommodating the bending of the web 32 in a direction normal to the plane of the web 32.

Figures 23A, 23B, 23C:
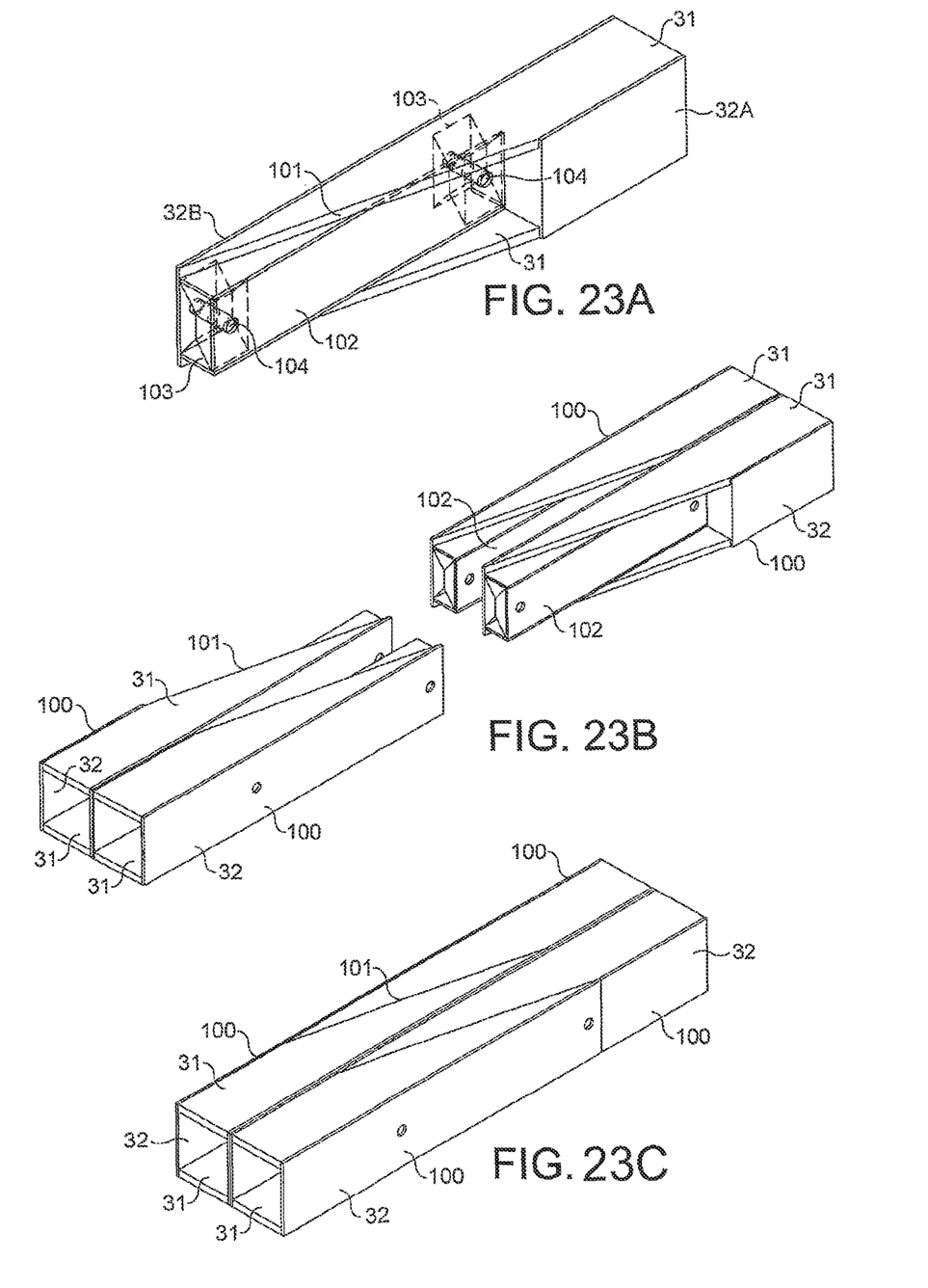
FIG. 23A is a perspective view of an alternative beam section with some detail shown in outline.
FIG. 23B is a perspective view of a spar arrangement prior to assembly made up of closed beam sections as shown in FIG. 23A.
FIG. 23C is a view showing the components of FIG. 23B in an assembled configuration.

FIGS. 23A-23C show spar units made up of closed beam sections. In FIGS. 23B and 23C, two sections are shown each comprising two closed or box beams 100 each of which comprises a pair of flanges 31 connected by a pair of webs 32. Each flange 31 has an elongate taper 101 at the end approaching the joint and one of the webs 32A of each beam terminates well short of the other web 32B. A second web 102 is fixed within the joint at half of the flange width and parallel to the webs 32. The second web 102 is attached to the web 32B by mounting blocks 103 which have pin holes 104. When the beams are brought together as shown in FIG. 23C, there will again be a plurality of overlapping webs 32 and 102 and abutting flanges 31. The webs may be joined via the mounting blocks 103 using the overlapping joints described above in relation to FIGS. 15 to 18.

Figure 24:
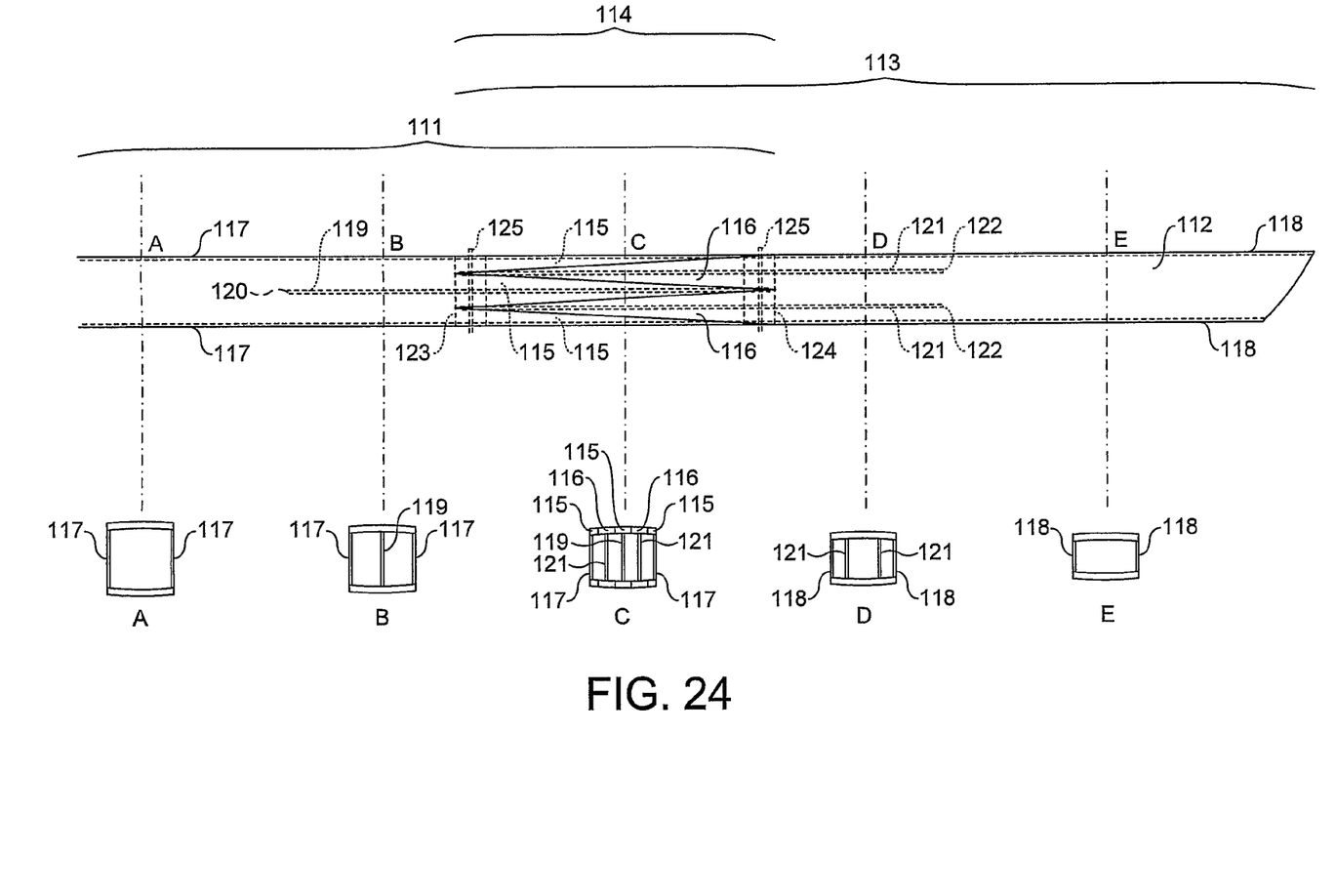
FIG. 24 is a plan view of a known box spar to which the joining technique of one aspect of the present invention is applied with sections shown along the length of the spar as A-E.

FIG. 24 shows a known spar to which the joining technique of one aspect of the present invention may be applied.

Unlike the previous examples, the spar is not made of a plurality of beams arranged side by side. Instead, the spar is a single box section shown in FIGS. 24A and E. Such a box beam spar is known, for example, in WO2006/002621. The modification in FIG. 24 relates to the manner in which two sections are joined. The plan view of FIG. 24 looks down on the flanges of the two sections. The flange of a first section 110 extends for a length 111 while the flange of the second section 112 extends for a length 113 leaving length 114 in which the two flanges are interdigitated as shown. The flange 110 has three projections 115 with oblique surfaces which abut against corresponding projections 116 on flange 112.

As shown in FIG. 24C the lower flange corresponds to the upper flange although different configurations of projections can be provided for the lower flange.

The first section 110 has a pair of webs 117 while the second section 112 has a pair of webs 118.

The first section 110 additionally has a supplementary web 119 beginning at an intermediate location 120 and extending generally along the centre line of the spar to the end of the first section within central projection 115.

Similarly, the second section 112 has a pair of supplementary webs 121 beginning at an intermediate location 122, spaced approximately a quarter of the way across the width of the section and extending generally parallel to the webs 118 to the end of projections 116. This will be appreciated from FIG. 24C where all of flanges 117, 119 and 121 are generally parallel to one another. Although they are shown at the quarter and half way points across the width of the spar, the precise location is not critical. The webs are provided with bearing blocks at locations 123, 124 which are arranged in a similar manner to those shown in FIG. 16. Hence the two sections are brought together with the bearing blocks abutting, and are secured by pins 125 in the manner described above.

Figure 25:
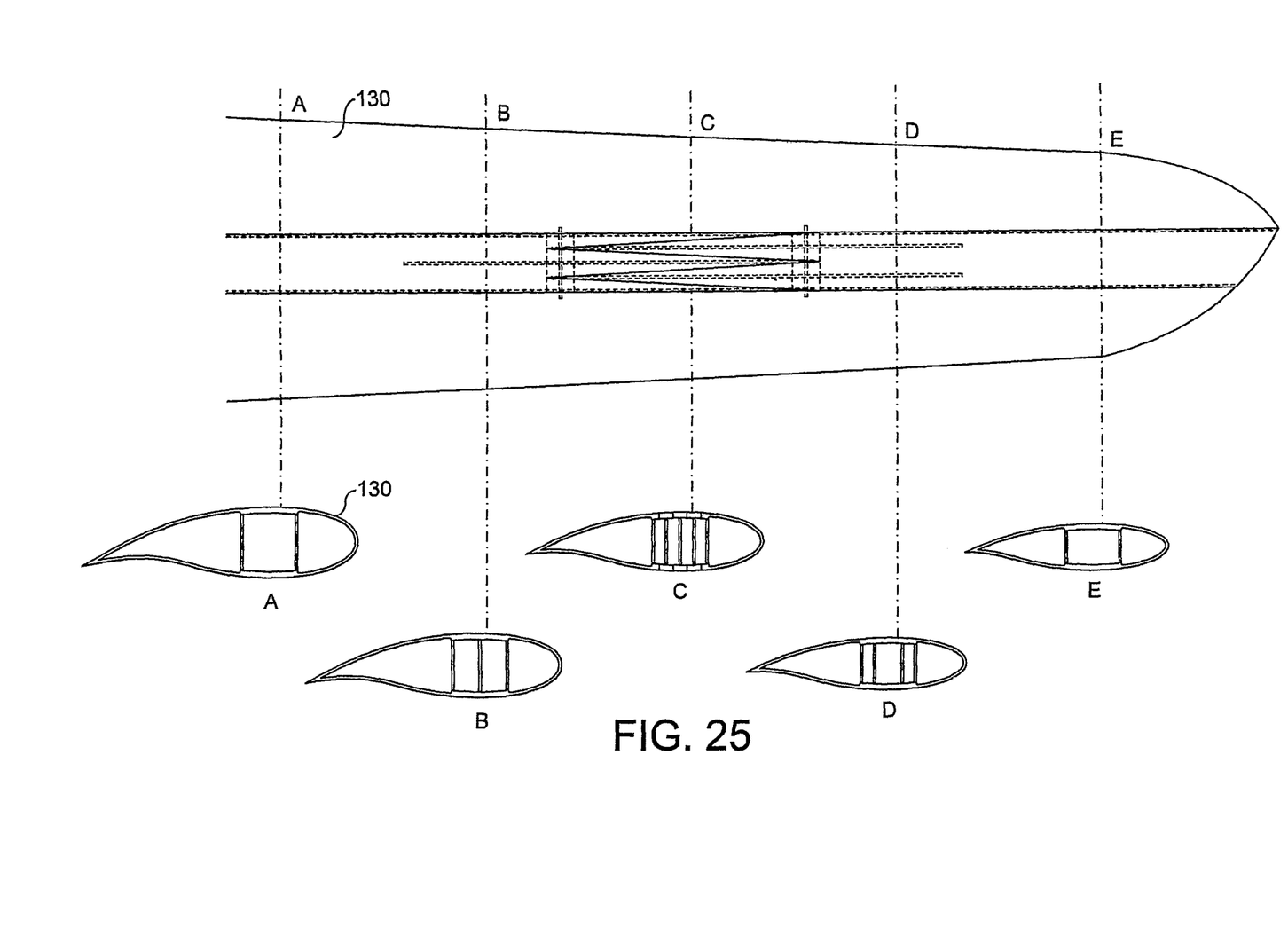
FIG. 25 is a plan view of a known blade to which the joining technique of one aspect of the present invention is applied with various sections shown along the length of the blade as A-E.

FIG. 25 shows how the jointing method may be applied to a modular blade such as that disclosed in EP1584817. This again has a single box beam spar, but in this case the box beam spar forms an integral part of the blade rather than being a separate component. Thus, the only difference between FIGS. 24 and 25 is the presence of the skin panels 130 which are integral with the flanges of the spar.

It will be appreciated that the modular wind turbine blades 10, 10' described above are examples only and that other arrangements of the component parts are envisaged. In particular, the component parts may be made of any suitable material including plastics, fibre reinforced plastics, wood, aluminium and steel. Furthermore, the material of the component parts need not be consistent throughout the blade structure. Specifically, different materials may be used in different sections of the spar 30, 30' as load requirements dictate.

The invention claimed is:

1. A modular wind turbine blade, comprising:
   a root at one end for connection to a hub,
   a spar extending from the root towards a tip at the opposite end, and
   at least two skin panels which are supported by the spar and which form a closed blade section, wherein the spar comprises a plurality of spar units arranged end to end along the length of the spar, and wherein the spar comprises a plurality of beams arranged side by side, each beam having at least one longitudinal web with a flange at either longitudinal edge, wherein the plurality of spar units are joined end to end by the plurality of beams of one spar unit being connected to the plurality of beams of the adjacent spar unit, and wherein the number of beams arranged side by side decreases towards the tip.

2. The modular wind turbine blade of claim 1, wherein adjacent spar units are primarily connected together at their webs.

3. The modular wind turbine blade of claim 1, wherein at least one of the spar units is curved.

4. The modular wind turbine blade of claim 3, wherein the curvature is such that the tip of the blade is closer to windward when the blade is mounted on the hub in an unloaded configuration.

5. The modular wind turbine blade of claim 3, wherein the curvature is such that the tip of the blade is behind the rest of the blade in the direction of rotation.

6. The modular wind turbine blade of claim 3, wherein the at least one curved spar unit is located proximate the tip of the blade.

7. The modular wind turbine blade of claim 3, wherein the at least one curved spar unit is located between two substantially straight spar units.

8. The modular wind turbine blade of claim 3, wherein the at least one curved spar unit is made from fibre reinforced plastic.

9. The modular wind turbine blade of claim 1, wherein one or more of the, roots, spar units or skin panels are made from fibre reinforced plastic.

10. The modular wind turbine blade of claim 1, wherein adjacent sections of the spar are connected together by mechanical fixings.

11. The modular wind turbine blade of claim 1, wherein adjacent sections of the spar are bonded together.

12. A modular spar for a wind turbine blade, the modular spar comprising:
a plurality of spar units arranged end to end, wherein each spar unit comprises, at least in the region adjacent to an adjacent unit, a plurality of beams arranged side by side and a plurality of shear webs overlapping with the adjacent spar unit, the units being primarily connected together via the overlapping shear webs, and wherein the number of beams arranged side by side decreases towards a tip of the modular spar.

13. The modular spar of claim 12 further comprising bearing blocks to support the join between adjacent shear webs.

14. The modular spar of claim 13 wherein adjacent webs are pinned together via the bearing blocks.

15. The modular spar of claim 12, wherein each spar unit comprises a single box beam section having a pair of shear webs, and at least one auxiliary shear web extends between the shear webs of the box beam section in a direction generally parallel to the shear webs of the box beam section, and at least in the portion of the spar unit adjacent to an adjacent unit.

16. A wind turbine blade comprising a modular spar according to claim 12.

17. The wind turbine blade of claim 16, further comprising a plurality of skin panels forming an outer surface of a blade section, the skin panels being integral with the modular spar.

* * * * *